(12) United States Patent
Tell et al.

(10) Patent No.: US 9,100,094 B2
(45) Date of Patent: Aug. 4, 2015

(54) SYSTEM AND METHOD FOR TUNING A SERIAL LINK

(71) Applicant: NVIDIA Corporation, Santa Clara, CA (US)

(72) Inventors: Stephen G. Tell, Chapel Hill, NC (US); John W. Poulton, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/870,921

(22) Filed: Apr. 25, 2013

(65) Prior Publication Data

US 2014/0321579 A1 Oct. 30, 2014

(51) Int. Cl.
*H04B 1/30* (2006.01)
(52) U.S. Cl.
CPC ............ *H04B 1/30* (2013.01); *H04B 2001/305* (2013.01)
(58) Field of Classification Search
CPC ....... H04L 7/04; H04L 7/0016; H04L 7/0054; H04B 1/30; H04B 2001/305
USPC ......... 375/317, 344, 224, 226, 316, 354, 355, 375/371
See application file for complete search history.

(56) References Cited

U.S. PATENT DOCUMENTS

| 8,199,866 | B2 | 6/2012 | Fuller et al. | |
|---|---|---|---|---|
| 2005/0259726 | A1* | 11/2005 | Farjad-rad | 375/232 |
| 2011/0051854 | A1* | 3/2011 | Kizer et al. | 375/340 |

OTHER PUBLICATIONS

Kim, Wang-Soo et al., "A 5.4-Gbit/s Adaptive Continuous-Time Linear Equalizer Using Asynchronous Undersampling Histograms," IEEE Transactions on Circuits and Systems-II: Express Briefs, vol. 59, No. 9, Sep. 2012, pp. 553-557.

* cited by examiner

*Primary Examiner* — Leon Flores
(74) *Attorney, Agent, or Firm* — Zilka-Kotab, PC

(57) ABSTRACT

A system and method are provided for tuning a serial link. The method includes receiving, by a receiver circuit, an offset correction pattern transmitted over a serial link and sampling the received offset correction pattern based on an offset correction parameter to generate a sampled signal. A distribution of the sampled signal is computed and the offset correction parameter is set based on the distribution. The system includes a receiver circuit that is coupled to the serial link and an offset correction unit that is coupled to the receiver circuit. The receiver circuit is configured to receive the offset correction pattern and sample the received offset correction pattern based on the offset correction parameter to generate the sampled signal. The offset correction unit is configured to compute the distribution of the sampled signal and set the offset correction parameter based on the distribution.

17 Claims, 10 Drawing Sheets

SYSTEM AND METHOD FOR TUNING A SERIAL LINK

This invention was made with Government support under Agreement No. HR0011-10-9-0008, awarded by DARPA. The Government has certain rights in the invention.

FIELD OF THE INVENTION

The present invention relates to serial link circuits used in data communications.

BACKGROUND

Conventional high-performance data communication systems include serial links that interconnect computer boards, integrated circuit devices, and subsystems within an integrated circuit device. A serial link typically includes a receiver circuit whose function is to convert an incoming signal that may contain analog imperfections, into a digital representation consisting of 1's and 0's. The receiver compares the incoming signal against a reference level when single-ended signaling is used to determine whether the incoming signal is interpreted as 0 or 1 at a given time. When differential signaling is used, the receiver compares true and complement versions of the differential signal against each other to determine whether the incoming signal is interpreted as 0 or 1 at a given time.

A problem in many receiver circuits is the presence of "offset" in the circuitry of the receiver, For example, instead of performing a comparison that is mathematically be described as $V_{input} < V_{ref}$, the actual comparison performed by the receiver is $V_{input} + V_{error} < V_{ref}$. $V_{input}$ is the voltage of the signal sampled at the receiver, $V_{ref}$ is a reference voltage used to distinguish between 0 and 1, and $V_{error}$ is the amount of error introduced by the receiver circuit or contained in the received signal. A correction value, $V_{corr}$, may be applied to counteract $V_{error}$, so that the comparison $V_{input} < V_{error} - V_{corr} + V_{ref}$ is performed by the receiver circuit. The correction value enables the receiver to correctly interpret an incoming signal transmitted over the serial link.

Thus, there is a need for determining a correction value and/or addressing other issues associated with the prior art.

SUMMARY

A system and method are provided for tuning a serial link. The method includes receiving, by a receiver circuit, an offset correction pattern transmitted over a serial link and sampling the received offset correction pattern based on an offset correction parameter to generate a sampled signal. A distribution of the sampled signal is computed and the offset correction parameter is set based on the distribution. The system includes a receiver circuit that is coupled to the serial link and an offset correction unit that is coupled to the receiver circuit. The receiver circuit is configured to receive the offset correction pattern and sample the received offset correction pattern based on the offset correction parameter to generate the sampled signal. The offset correction unit is configured to compute the distribution of the sampled signal and set the offset correction parameter based on the distribution.

DETAILED DESCRIPTION

A correction value, $V_{corr}$, may be determined when a tuning process is performed. The correction value that is determined enables a receiver circuit to correctly interpret a signal transmitted over a serial link by a transmitter.

Figure 1:
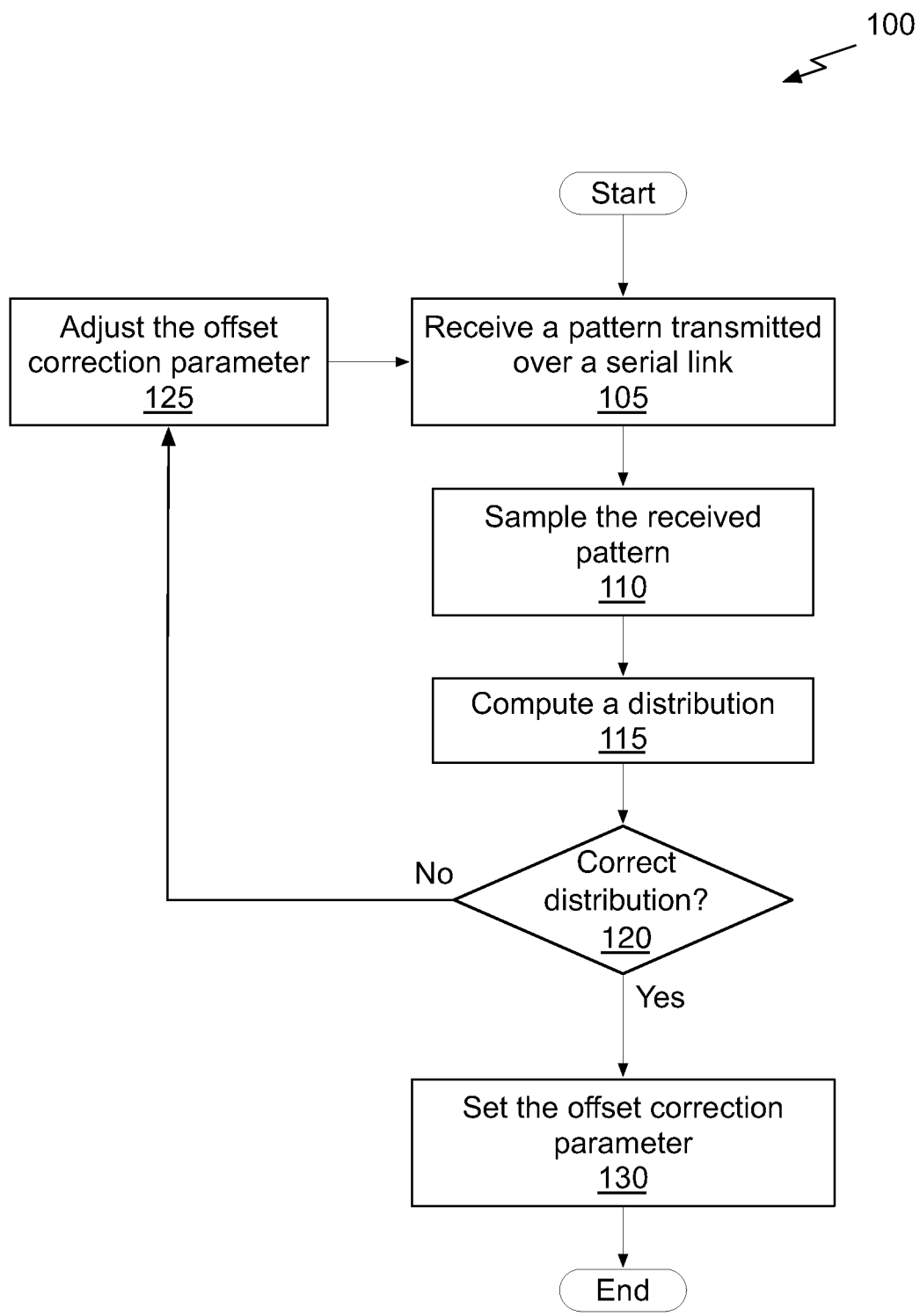
FIG. 1 illustrates a flowchart of a method for tuning a serial link, in accordance with one embodiment.

FIG. 1 illustrates a flowchart 100 of a method for tuning a serial link, in accordance with one embodiment. At operation 105, an offset correction pattern that is transmitted over the serial link is received. In one embodiment, the offset correction pattern is predetermined and configured with a known ratio of binary ones and zeros. For example, the offset correction pattern may include a nearly equal number of binary ones and zeros, resulting in a known ratio of 1-to-1 or 50%. The offset correction pattern may include alternating sequences of one or more binary ones or zeros, so that the overall ratio of ones to zeros over a period of time is a known ratio. At operation 110, the received offset correction pattern is sampled based on an offset correction parameter to generate a sampled signal. The offset correction parameter modifies a reference voltage level that is used to distinguish between ones and zeros. In the context of the present embodiment, the offset correction parameter enables the receiver to correctly interpret an incoming signal transmitted over the serial link. At operation 115, a distribution of the sampled signal is computed. In the context of the present embodiment, a distribution refers to any distributed function associated with the sampled signal. For example, in one embodiment, the distribution is a ratio of the binary ones to zeros of the sampled signal over a period of time.

At operation 120, the distribution is compared with the known ratio of the offset correction pattern that was transmitted, If the distribution equals or is within a threshold value of the known ratio, the distribution is correct, and at operation 130, the offset correction parameter is set. In one embodiment, at operation 130, because the distribution is correct, the offset correction parameter is set to the same offset correction parameter value that was used to sample the received pattern at operation 110. If, at operation 120, the distribution is not correct, then at operation 125, the offset correction parameter is adjusted (e.g., increased or decreased) and operations 105, 110, 115, and 120 are repeated.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
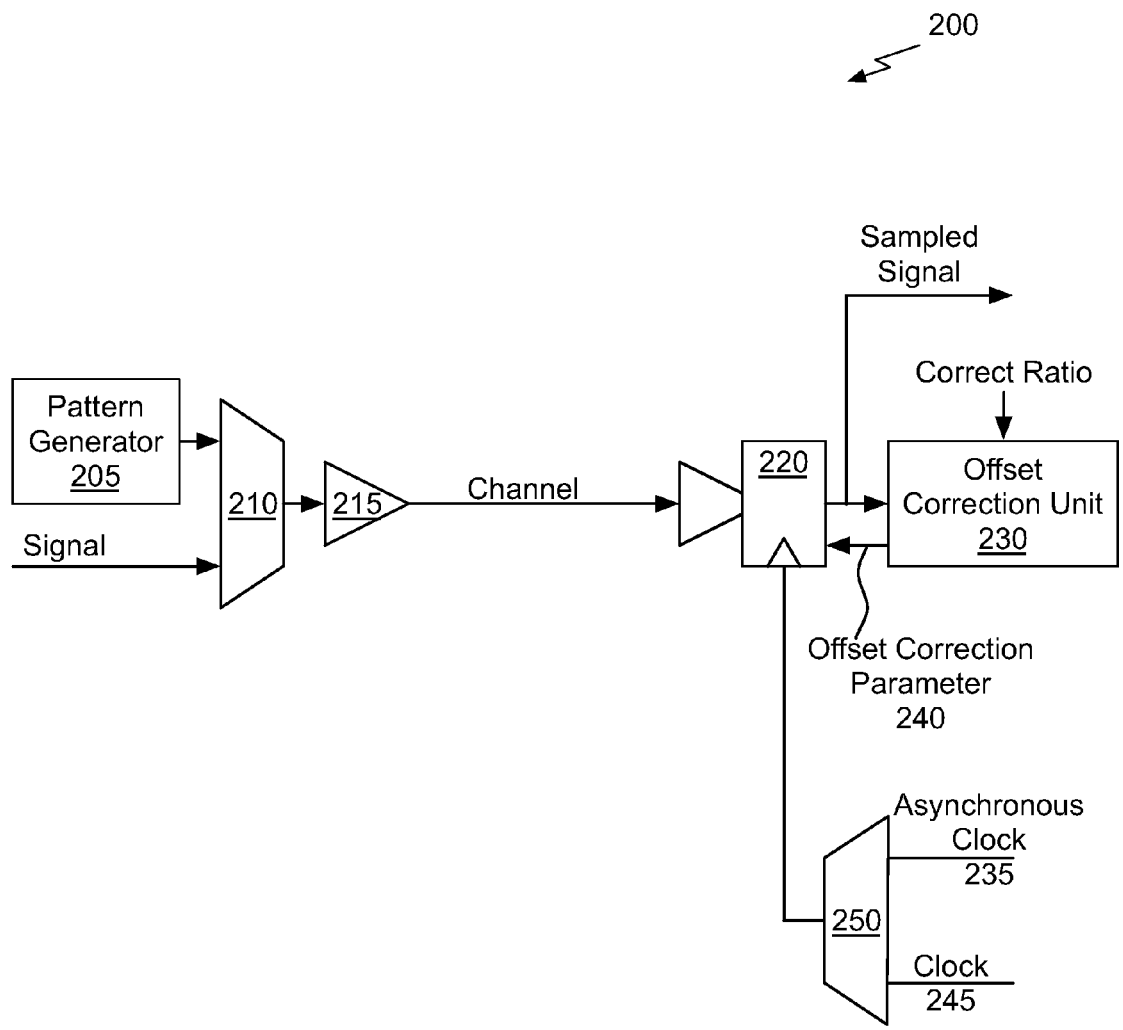
FIG. 2A illustrates a diagram of a serial link and tuning circuitry that includes a pattern generator and an offset correction unit, in accordance with one embodiment.

FIG. 2A illustrates a diagram of a serial link and tuning circuitry 200 that includes a pattern generator 205 and an offset correction unit 230, in accordance with one embodiment. The pattern generator 205 is configured to generate a known offset correction pattern including binary ones and zeros. For example, in one embodiment, the offset correction pattern may be an alternating pattern of ones and zeros, e.g., 0,1,0,1 . . . In one embodiment, the pattern generator 205 may be configured to implement a linear feedback shift register to generate a known offset correction pattern that is a pseudorandom bit sequence. A pseudorandom bit sequence contains many different frequency components, so that an offset correction parameter that is set based on a pseudorandom bit sequence is insensitive to frequency-dependent attenuation effects and equalization errors.

When the serial link and tuning circuitry 200 is configured in a tuning mode to adjust and set an offset correction parameter 240, a multiplexer 210 selects the known offset correction pattern generated by the pattern generator 205 for output to a transmitter 215. During normal operation, such as when a channel is configured to transmit a data or clock signal, the multiplexer 210 selects a signal for output to the transmitter 215. The transmitter 215 transmits a signal output by the multiplexer 210 across a channel of the serial link. The transmitted signal is received by a receiver circuit 220 that is configured to generate a sampled signal.

When the serial link and tuning circuitry 200 is configured in the tuning mode, a multiplexer 250 selects an asynchronous clock 235 for output to the receiver circuit 220. Otherwise, during normal operation, a clock 245 is selected by the multiplexer 250 for output to the receiver circuit 220. The dock 245 is configured to capture the received signal in a center of a "data eye" (i.e., a time when the signal is stable and unchanging), so that the received signal is stable and can be accurately sampled. The asynchronous clock 235 is not synchronous with the clock 245, so that the received signal is not always captured in the center of the "data eye". When the receiver circuit 220 captures a received signal using the asynchronous clock 235, the times at which the received signal is captured are uniformly distributed across an entire period of the received signal. In one embodiment, the asynchronous clock 235 is also asynchronous to the clock used at the transmitter and may be configured to sweep across the clock used at the transmitter, so that a uniformly distributed random sampling may be achieved.

If a phase-locked loop (PLL) is used for generation of the clock 245 or for clock recovery, the PLL can be operated in an "unlocked" mode to generate the asynchronous clock 235. Using an existing PLL is advantageous in that additional circuitry needed to produce the asynchronous clock 235 for tuning the offset correction parameter is minimized. Alternately, a ring oscillator may be used to generate the asynchronous clock 235.

The sampling operation performed by the receiver 220 involves two steps to generate the digital sampled signal that includes binary ones and zeros. First, the receiver 220 captures the received signal using a clock provided by the multiplexer 250 and compares the captured signal to the reference voltage level to generate a binary one or zero represented by the received signal. The binary one or zero is output by the receiver 220 as the sampled signal. As previously explained, the reference voltage level may be adjusted based on an offset correction parameter 240 to overcome an error introduced by the receiver circuit 220 or the transmitter circuit 225. In one embodiment, the reference voltage level (Vref) equals a difference between an initial voltage level (Vi) and the offset correction parameter (ocp), i.e., VRef=Vi−ocp.

The offset correction unit 230 is configured to receive the sampled signal and compute a distribution of binary values represented by the sampled signal over time. In one embodiment, the distribution is a ratio of the number of binary ones to the number of binary zeros in the sampled signal. The offset correction unit 230 may be configured to count the total number of bits in the sampled signal and also count either the number of bits that were a binary one or a binary zero to compute the distribution. The offset correction unit 230 compares the computed distribution to a correct ratio of binary values according to the offset correction pattern that was transmitted over the serial link by the transmitter 215. The offset correction unit 230 sets the offset correction parameter 240 based on the distribution, adjusting the offset correction parameter 240 as needed and repeating the tuning process until the computed distribution equals or is within a threshold value of the correct ratio. When the tuning process is complete, the receiving device informs the transmitting device that tuning is complete and normal operation may begin.

In a data communication system in which an explicit clock signal is transmitted on a channel of the serial link instead of a data signal, the clock signal is sampled by the receiver circuit 220. The offset correction unit 230 may be configured to generate a specific offset correction parameter 240 that is used by the receiver 220 during normal operation to sample the received clock signal and generate the clock 245. In one embodiment, the offset correction pattern that is used to tune the offset correction parameter 240 for generating the clock 245 is a pattern of alternating ones and zeros at the desired frequency of the clock 245.

Figure 2B:
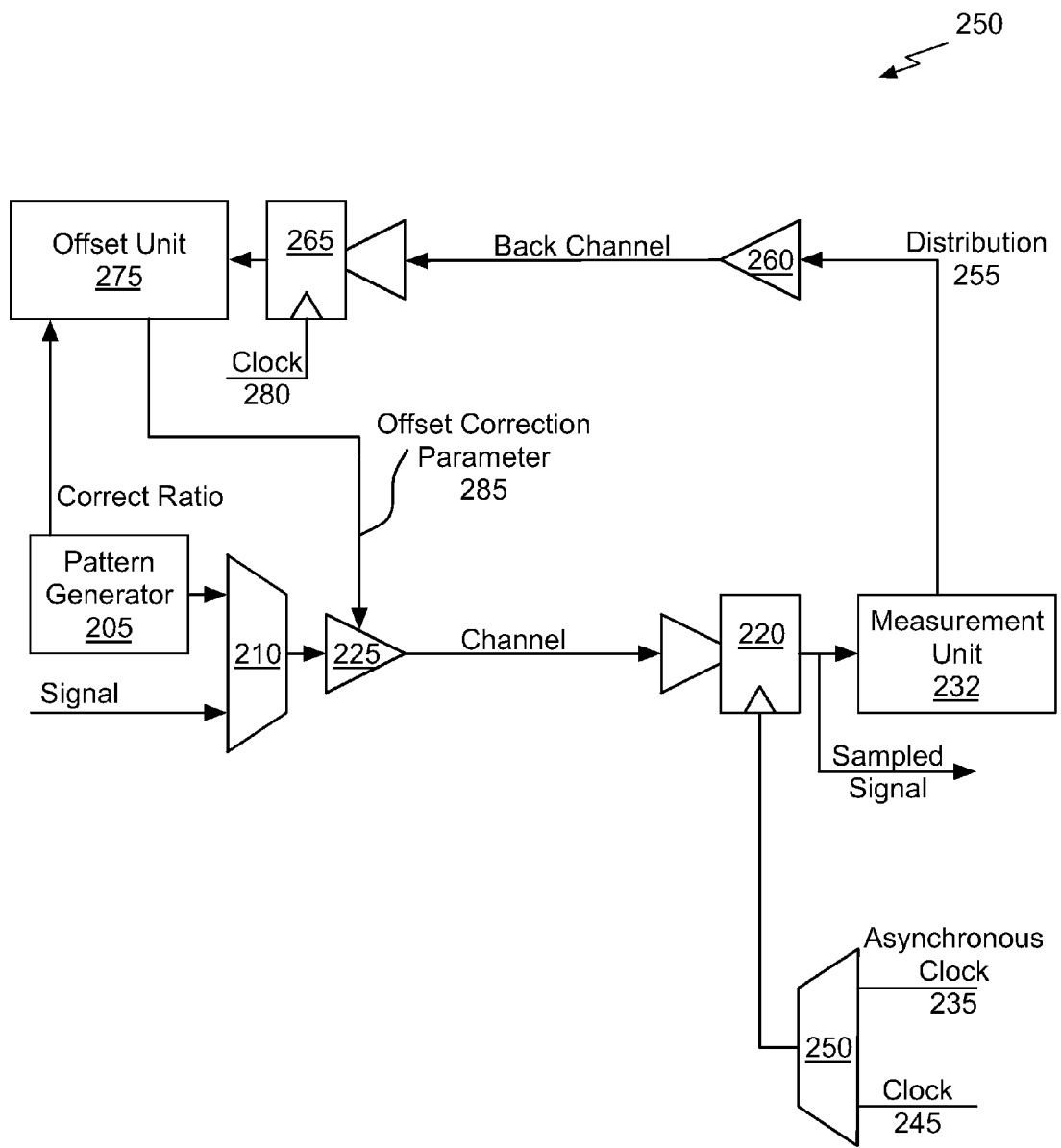
FIG. 2B illustrates a diagram of a serial link, a back channel, and tuning circuitry that includes a pattern generator, a measurement unit, and an offset correction unit, in accordance with one embodiment.

FIG. 2B illustrates another diagram of a serial link and tuning circuitry 250 that includes the pattern generator 205, a measurement unit 232, and a back channel, in accordance with one embodiment. An offset correction parameter 285 may be applied to the signal that is transmitted instead of adjusting the reference voltage level used by the receiver circuitry 220, so that the voltage levels of the bits represented by the signal are adjusted and are accurately sampled by the receiver circuitry 220.

The pattern generator 205, multiplexer 210, receiver circuit 220, and multiplexer 250 function as previously described in conjunction with FIG. 2A. A transmitter 225 is configured to apply an offset correction parameter 285 to the signal received from the multiplexer 210 before the signal is output on the channel to the receiver circuit 220. A measurement unit 232 that is coupled to the receiver circuit 220 processes the sampled signal and computes a distribution 255, performing operations previously described in conjunction with the offset correction unit 230.

The distribution 255 is transmitted, by a transmitter 260 over a back channel, to the originating device or sub-circuit within a device that transmitted the offset correction pattern over the channel. The distribution 255 is sampled by a receiver circuit 265 using a clock 280 to obtain the distribution 255 that is provided to the offset unit 275. The offset unit 275 may be configured to compare the distribution 255 to a correct ratio provided by the pattern generator 205. The correct ratio represents the ratio of binary values according to the offset correction pattern that was transmitted over the serial link by the transmitter 225. The offset unit 275 sets the offset correction parameter 285 based on the distribution 255, adjusting the offset correction parameter 285 as needed until the distribution 255 equals or is within a threshold value of the correct ratio. When the tuning process is complete, the originating device may begin normal operation and transmit a data or clock signal over the channel.

Figure 3A:
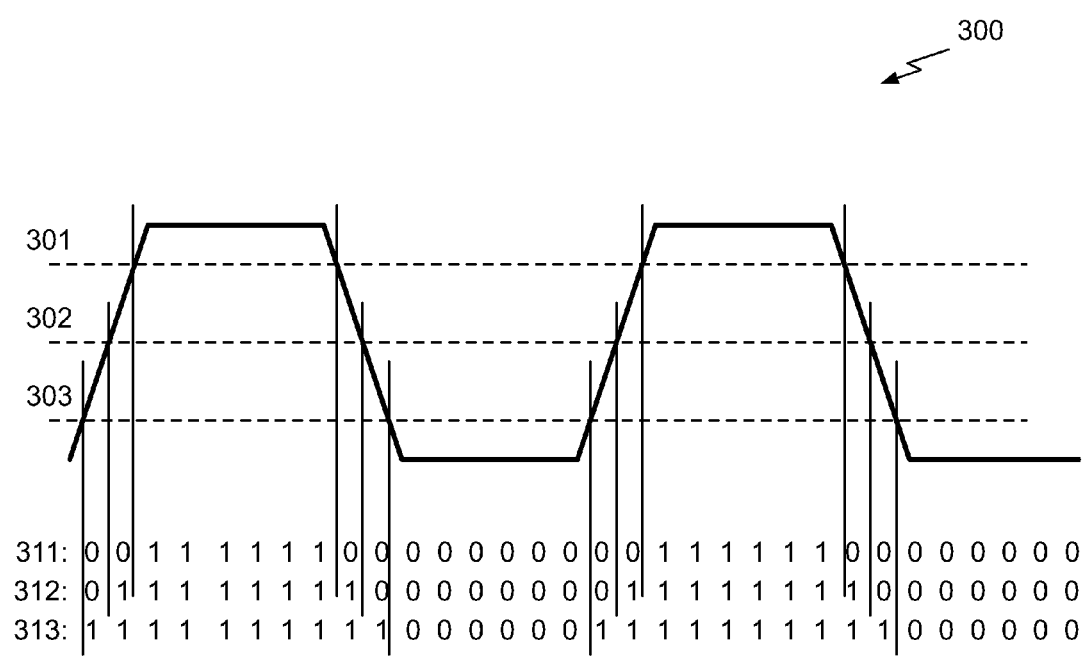
FIG. 3A illustrates a waveform of a transmitted signal that is sampled based on three offset correction parameter values, in accordance with one embodiment.

FIG. 3A illustrates a waveform 300 of a received signal that is sampled based on three offset correction parameter values, in accordance with one embodiment. A first offset correction parameter value corresponds to the reference voltage level 301, a second offset correction parameter value corresponds to the reference voltage level 302, and a third offset correction parameter value corresponds to the reference voltage level 303. When the first offset correction parameter value is applied to sample the received signal, a sequence 311 of ones and zeros shown below the waveform 300 is the sampled signal output by the receiver circuit 220 and the sampled signal includes more zeros than ones. The correct ratio for the offset correction pattern shown in FIG. 3A is 1-to-1 or 50%. When the third offset correction parameter value is applied to sample the received signal, the sequence 313 of ones and zeros that is the sampled signal includes more ones than zeros. When the second offset correction parameter value is applied to sample the received signal, the sequence 312 of ones and zeros that is the sampled signal includes an equal number of ones and zeros. The offset correction unit 230 sets the offset correction parameter 240 to the second offset correction parameter.

During the tuning process, the order in which the different offset correction parameters are applied is assumed to correspond to the following ordering of the sequences: 311, 313, and 312. The offset correction unit 230 computes a distribution for the sequence 311 and adjusts the offset correction parameter 240 to reduce the reference voltage level by increasing the offset correction parameter 240 when the distribution represents a ratio of more ones than zeros (the offset correction parameter 240 is subtracted to generate the reference voltage level). The offset correction pattern is received again and sampled based on the increased offset correction parameter 240. The offset correction unit 230 computes a distribution for the sequence 313 and adjusts the offset correction parameter 240 to increase the reference voltage level by reducing the offset correction parameter 240 because the distribution represents a ratio of less ones than zeros (i.e., the distribution is greater than the correct ratio). The offset correction pattern is received again and sampled based on the decreased offset correction parameter 240 that corresponds to the reference voltage level 302 and the offset correction unit 230 computes a distribution for the sequence 312 and sets the offset correction parameter 240 to the second offset correction parameter because the distribution equals the correct ratio.

When the originating device or sub-circuit that transmitted the offset correction pattern over the channel is configured to adjust the signal that is transmitted over the channel based on the offset correction parameter 285 (as described in conjunction with FIG. 2B), the offset unit 275 is configured to adjust the offset correction parameter 285 based on the distributions 255 corresponding to the sequences 311, 312, and 313. The offset unit 275 adjusts the offset correction parameter 285 to increase the voltage level of the signal transmitted on the channel when the distribution represents a ratio of less ones than zeros (the offset correction parameter 285 is effectively subtracted from the reference voltage level used by the receiver circuit 220). The offset unit 275 adjusts the offset correction parameter 285 to decrease the voltage level of the signal transmitted on the channel when the distribution represents a ratio of more ones than zeros (i.e., the distribution is greater than the correct ratio).

Figure 3B:
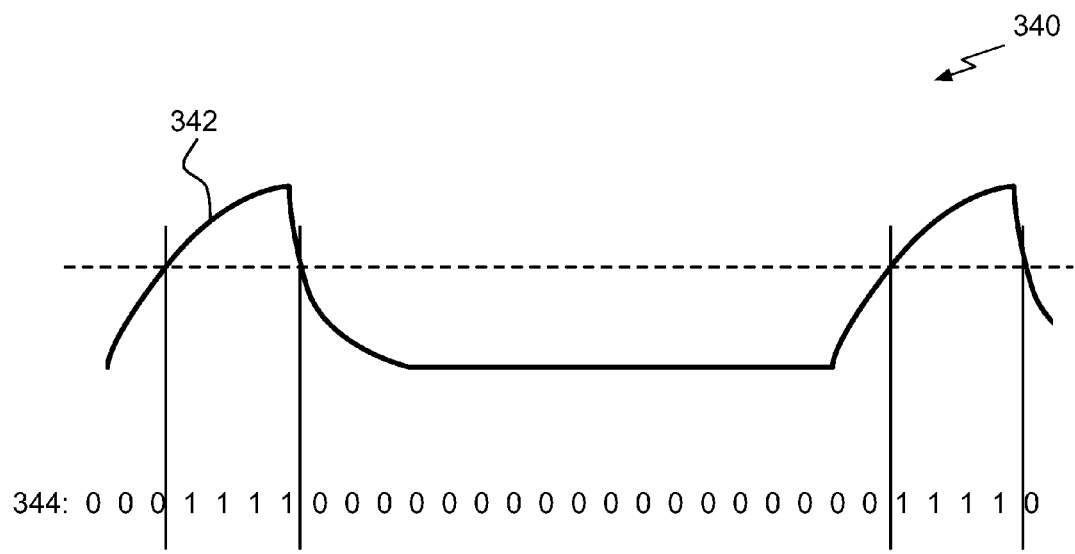
FIG. 3B illustrates a waveform of a transmitted signal that is under-equalized based on a frequency compensation parameter, in accordance with one embodiment.

The tuning process that is used to adjust the offset correction parameter may also be used to calibrate a frequency compensation parameter. FIG. 3B illustrates a waveform 340 of a transmitted signal 342 that is under-equalized based on the frequency compensation parameter, in accordance with one embodiment. The received signal that is not yet converted into binary values may be processed by a frequency compensation circuit (e.g., receiving equalizer) in a receiving device to compensate for frequency-dependent attenuation in the channel. Similarly, a transmitted signal may be processed by a frequency compensation circuit (e.g., transmitter preemphasis circuit) in an originating device to compensate for frequency-dependent attenuation in the channel. The frequency compensation parameter may be tuned so that the received signal is properly equalized. In the context of the present embodiment, the frequency compensation parameter may be a value that is used by the frequency compensation circuit to process the received signal. Examples of frequency compensation parameters may include, without limitation, frequency-dependent gain or attenuation values specified at one or more frequency values or frequency bands. The received signal is processed by a frequency compensation unit to generated a compensated signal that is converted into binary values based on the reference voltage level to generate the sampled compensated signal. The sampled compensated signal corresponding to the processed signal 342 is shown as a sequence 344 of ones and zeros. The processed signal 342 represents the sampled signal after compensation has been performed using the frequency compensation parameter.

The pattern generation unit 205 may be configured to generate a frequency compensation calibration pattern. The frequency compensation calibration pattern may include a repeating sequence of one or more ones followed by one or more zeros. In one embodiment, the frequency compensation calibration pattern may be a repeating pattern chosen to contain frequency spectra at two or more frequencies. The ratio of ones to zeros in the repeating sequence is a known ratio. In the context of the following embodiment, the offset correction parameter enables the receiver to correctly compensate for frequency-dependent attenuation of an incoming signal transmitted over the serial link. The frequency compensation calibration pattern that is generated may correspond to a particular characteristic of a channel. For example, the frequency compensation calibration pattern may be a repeating 4-bit pattern of a single one followed by three zeros, in order to contain energy at a frequency corresponding to the bit channel symbol rate and at ¼th of that rate.

Figure 3C:
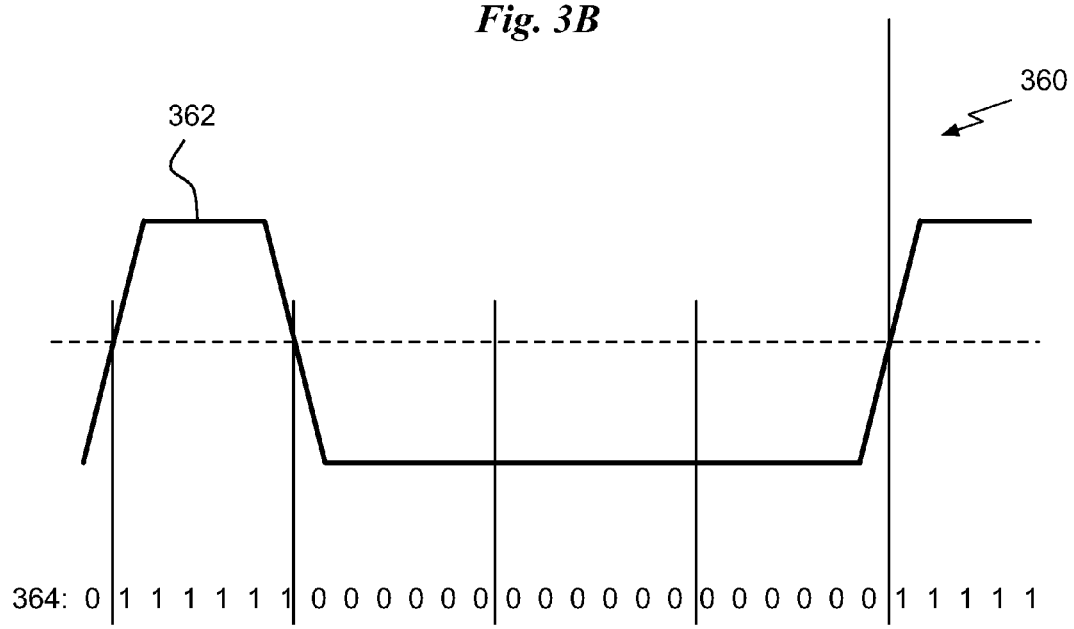
FIG. 3C illustrates a waveform of a transmitted signal that is properly equalized based on a frequency compensation parameter, in accordance with one embodiment.

FIG. 3C illustrates a waveform 360 of a transmitted signal 362 that is properly equalized based on a frequency compensation parameter, in accordance with one embodiment, The sequence 364 is the compensated signal that was sampled by a receiver circuit after being processed by a frequency compensation unit based on the frequency compensation parameter. The ratio of ones to zeros in the sequence 364 is 1-to-3

(25%) which is correct according to a 25% ratio of a frequency compensation calibration pattern. In contrast, the sequence 344 shown in FIG. 3B is not correct according to the 25% ratio for the same frequency compensation calibration pattern. A frequency compensation parameter that is used by the frequency compensation unit to process the received signal may be adjusted based on a distribution that is computed for the sequence 344 to produce a compensated signal corresponding to the properly equalized transmitted signal 362.

Figure 3D:
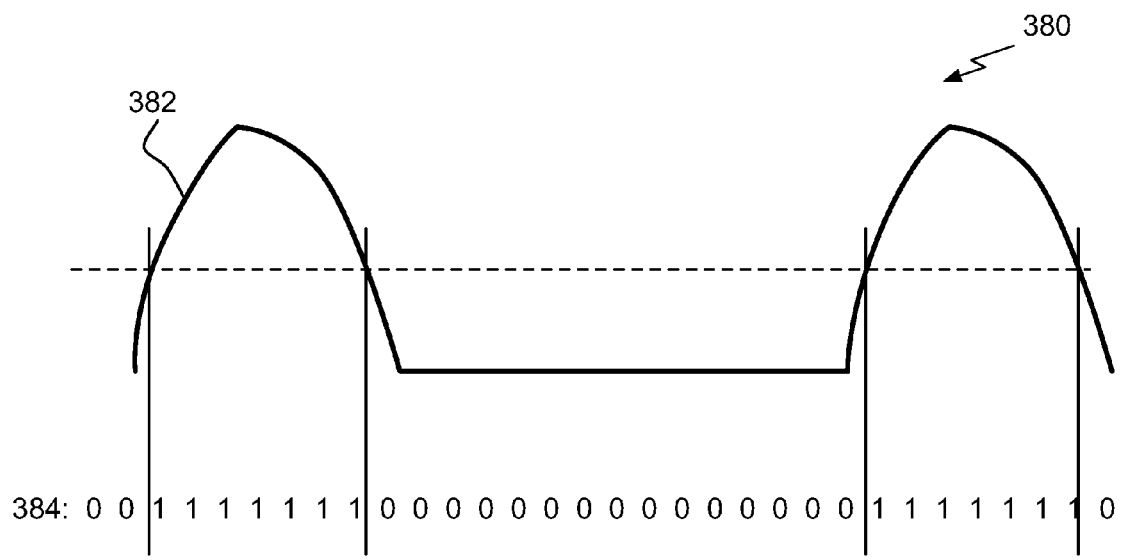
FIG. 3D illustrates a waveform of a transmitted signal that is over-equalized based on a frequency compensation parameter, in accordance with one embodiment.

FIG. 3D illustrates a waveform 380 of a transmitted signal 382 that is over-equalized based on a frequency compensation parameter, in accordance with one embodiment. Again, the frequency compensation parameter that is used by the frequency compensation unit to process the received signal may be adjusted based on a distribution that is computed for the sequence 384. The frequency compensation parameter should be adjusted during the tuning process to produce a compensated signal corresponding to the properly equalized transmitted signal 362.

Figure 4A:
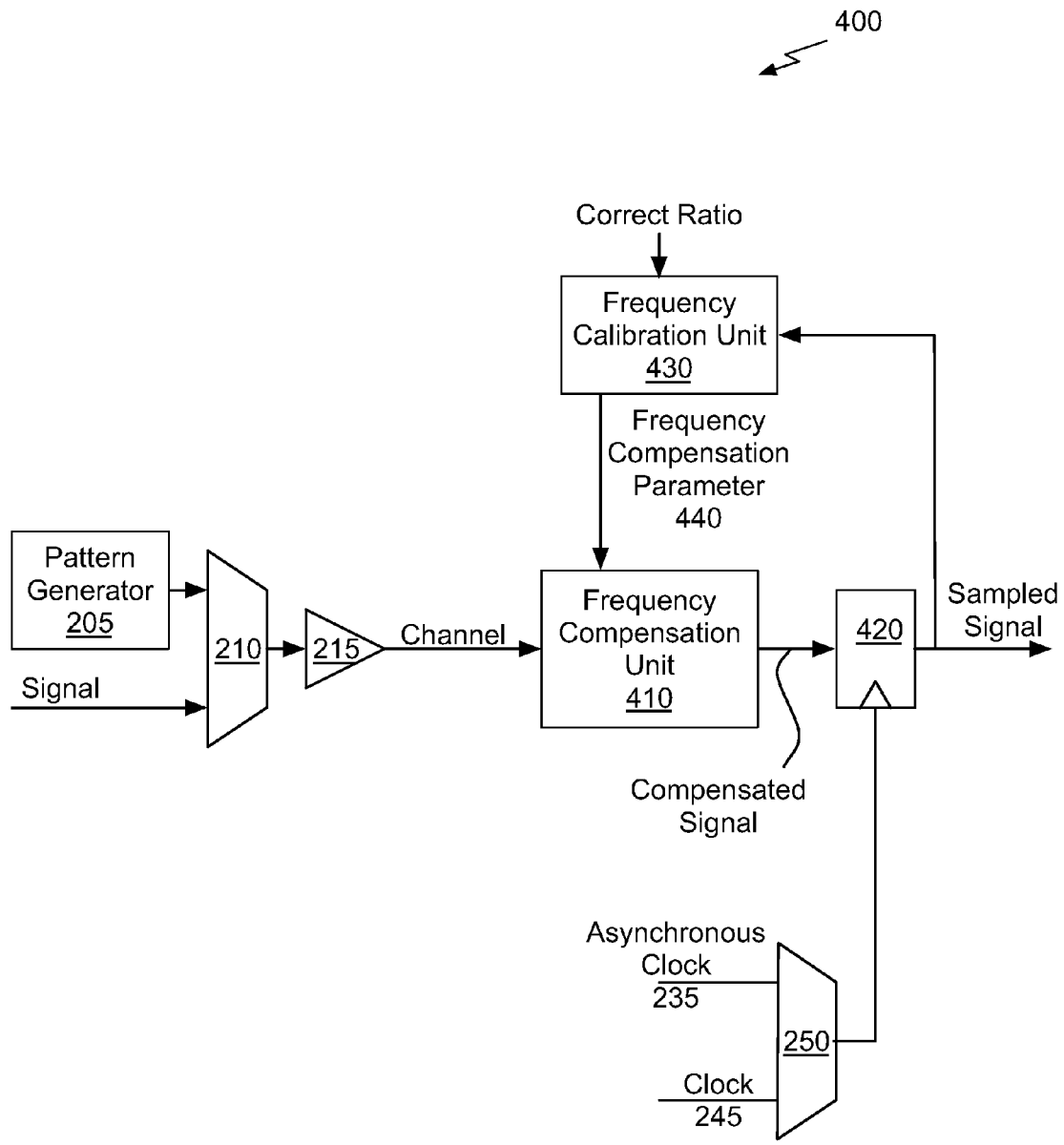
FIG. 4A illustrates a diagram of a serial link and tuning circuitry that includes a pattern generator, a frequency compensation unit, and a frequency calibration unit, in accordance with one embodiment.

FIG. 4A illustrates a diagram of a serial link and tuning circuitry 400 that includes a pattern generator 205, a frequency compensation unit 410, and a frequency calibration unit 430, in accordance with one embodiment. The pattern generator 205, multiplexer 210, transmitter 215, and multiplexer 250 function as previously described in conjunction with FIG. 2A. A receiver circuit 420 performs the same functions as previously described receiver circuit 220, except that the receiver circuit 420 operates on a compensated signal. In addition to (or instead of) an offset correction pattern, the pattern generator 205 may be configured to generate a frequency compensation calibration pattern. The receiver circuit 420 is configured to convert the compensated signal into binary values (ones and zeros) based on a reference voltage level. When the serial link and tuning circuitry 400 is configured in a tuning mode, the sampled compensated pattern represents the frequency compensation calibration pattern.

The received signal is processed by a frequency compensation unit 410 to generate a compensated signal. The received frequency compensation calibration pattern is processed (i.e., filtered) based on the frequency compensation parameter 440 to generate the compensated signal. based on the reference voltage level to generate the sampled signal. A frequency calibration unit 430 is configured to compute a distribution for the sampled signal. The distribution is compared with the correct ratio, and the frequency compensation parameter 440 is set by the frequency calibration unit 430. The correct ratio represents the ratio of binary values according to the frequency compensation calibration pattern that was transmitted over the serial link by the transmitter 215. The frequency calibration unit 430 sets the frequency compensation parameter 440 based on the distribution, adjusting the frequency compensation parameter 440 as needed until the distribution equals or is within a threshold value of the correct ratio. When the tuning process is complete, the transmitting device may initiate normal operation.

Figure 4B:
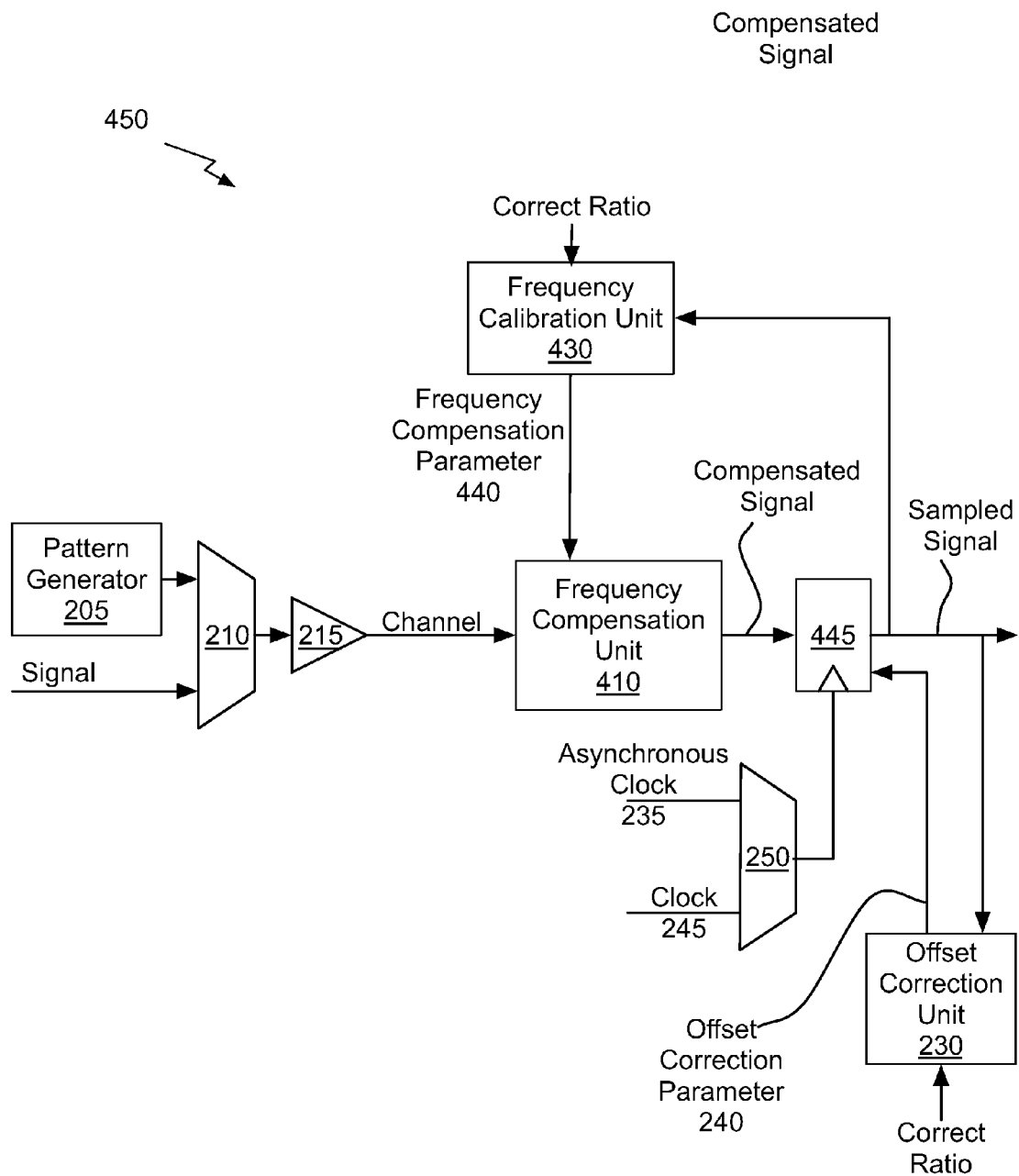
FIG. 4B illustrates a diagram of a serial link, offset correction tuning circuitry, and frequency calibration circuitry, in accordance with one embodiment.

FIG. 4B illustrates a diagram of a serial link and tuning circuitry 450, in accordance with one embodiment. The tuning circuit 450 includes offset correction tuning circuitry and frequency calibration circuitry. The pattern generator 205, multiplexer 210, transmitter 215, multiplexer 250, and offset correction unit 230 function as previously described in conjunction with FIG. 2A. The functions as previously described in conjunction with FIG. 2A. The frequency compensation unit 410, receiver circuit 420, and the frequency calibration unit 430 function as previously described in conjunction with FIG. 4A. In addition to an offset correction pattern, the pattern generator 205 may be configured to generate a frequency compensation calibration pattern. When the serial link and tuning circuitry 400 is configured in a tuning mode for tuning one or more frequency compensation parameters, the sampled signal represents the frequency compensation calibration pattern. When the serial link and tuning circuitry 400 is configured in a tuning mode for tuning the offset correction parameter, the sampled signal represents the offset correction parameter. As an option, the offset correction parameter may be tuned before one or more of the frequency compensation parameters are tuned.

In one embodiment, the frequency compensation processing may be performed by the transmitter before the signal is output over the channel to the receiver. In other words, the frequency compensation unit 410 may reside in the transmitting device and the frequency compensation parameters may be transmitted from the frequency calibration unit 430 to the frequency compensation unit 410 via a back channel. Alternatively, the distribution may be transmitted from the frequency calibration unit 430 via the back channel and used by the transmitting device to compute frequency compensation parameters. When the frequency compensation parameters are applied to the signal that is transmitted, the signal that is received is already compensated and can be accurately sampled by the receiver circuitry 420.

A data communication circuit may include one or more existing components that may be adapted to perform one or more functions of the tuning process. Configuring the existing components to perform the tuning process may minimize the additional circuit needed to implement tuning of the offset correction parameter and/or one or more frequency compensation parameters. For example, self-checking circuitry in a receiving device, such as counters configured to measure a bit error rate of the link, may be adapted to generate the distribution for the sampled signal and/or the compensated signal.

Figure 5:
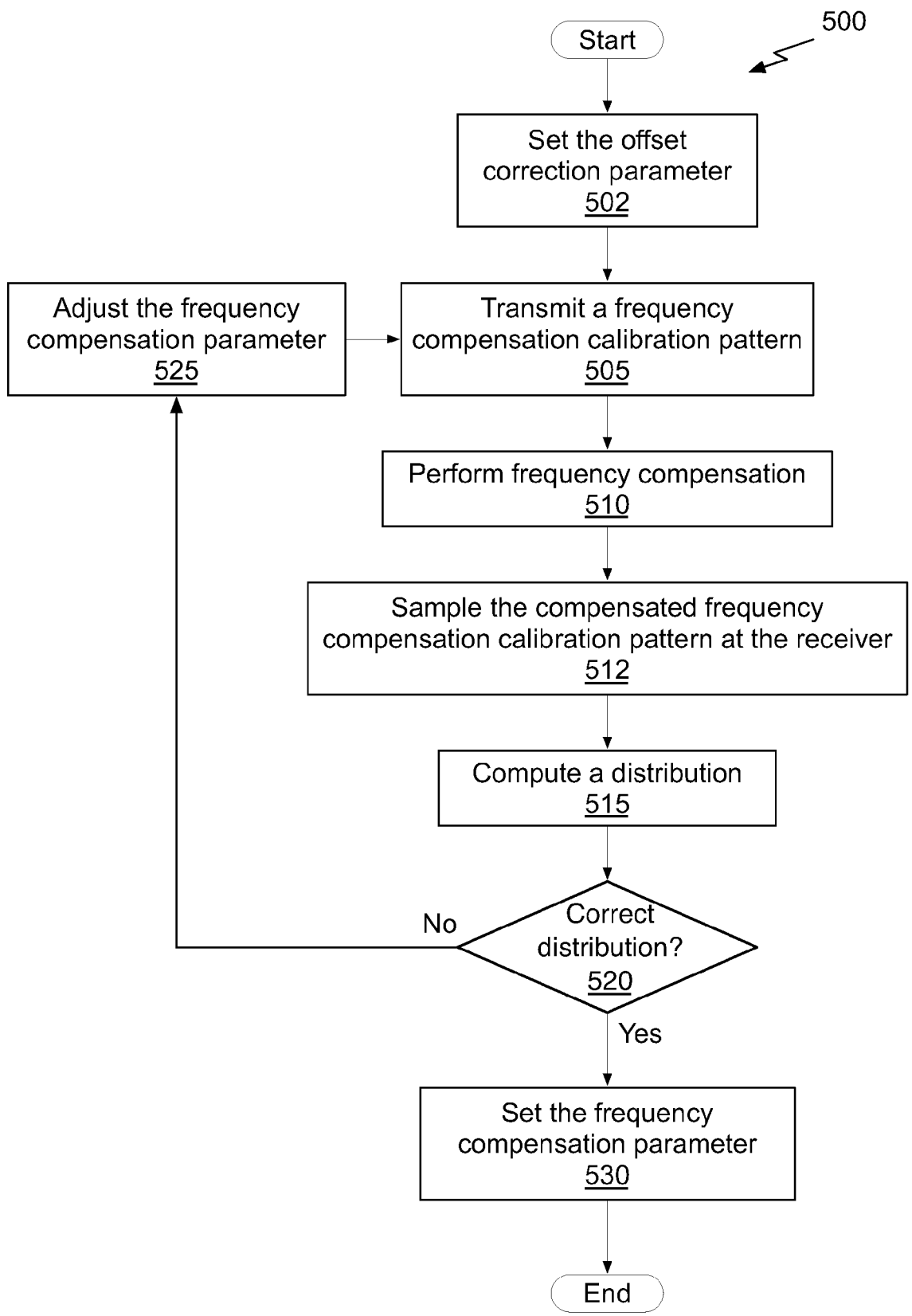
FIG. 5 illustrates a flowchart of a method for calibrating a frequency compensation unit, in accordance with one embodiment.

FIG. 5 illustrates a flowchart 500 of a method for calibrating a frequency compensation unit, in accordance with one embodiment. At operation 502, the offset correction parameter is set, where such offset correction parameter is used to sample a signal received by the receiver circuitry. The offset correction parameter may be tuned using the process shown if FIG. 1 or by another process. At operation 505, a frequency compensation calibration pattern that is transmitted over the serial link is received. In one embodiment, the frequency compensation calibration pattern is predetermined and configured with a known ratio of binary ones and zeros. For example, the frequency compensation calibration pattern may include a binary one for three binary zeros, resulting in a correct ratio of 25% (ones to zeros). At operation 510, the received signal is processed by the frequency compensation unit 410 based on the offset correction parameter to generate a compensated signal. At operation 512, the compensated signal is sampled by the sampler 420 to generate a sampled signal representing the frequency compensation calibration pattern. At operation 515, a distribution of the sampled signal is computed.

At operation 520, the distribution is compared with the correct ratio of the frequency compensation calibration that was transmitted. If the distribution equals or is within a threshold value of the correct ratio, the distribution is correct, and at operation 530, the frequency compensation parameter is set. In one embodiment, at operation 530, because the distribution is correct, the frequency compensation parameter is set to the same frequency compensation parameter value that was used to process the sampled signal at operation 512. If, at operation 520, the distribution is not correct, then at operation 525, the frequency compensation parameter is adjusted (e.g., increased or decreased) and operations 505, 510, 512, 515, and 520 are repeated.

Figure 6:
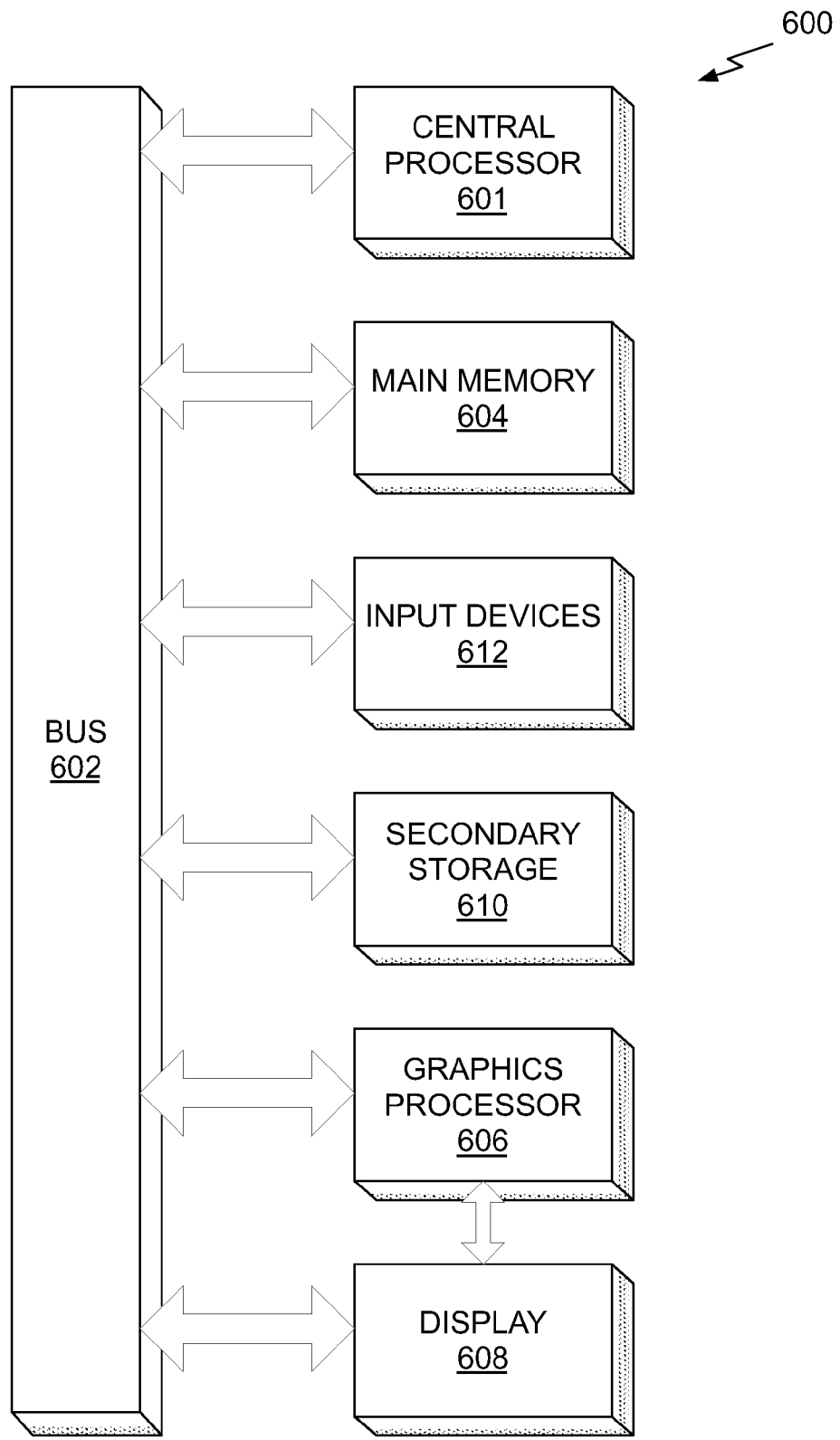
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI Peripheral Component Interconnect), PCI-Express, AGP (Accelerated Graphics Port), HyperTransport, or any other bus or point-to-point communication protocol(s). In one embodiment, one or more channels of the communication bus 602 may be implemented using a serial link and the serial link may be tuned using the process described in conjunction with FIGS. 1 and/or 5. The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 604 and/or the secondary storage 610. Such computer programs, when executed, enable the system 600 to perform various functions. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a receiver circuit, an offset correction pattern transmitted over a serial link;
   sampling the received offset correction pattern based on an offset correction parameter to generate a sampled signal;
   computing a distribution of the sampled signal;
   setting the offset correction parameter based on the distribution;
   receiving, by the receiver circuit, a frequency compensation calibration pattern transmitted over the serial link;
   processing the received frequency compensation calibration pattern based on a frequency compensation parameter to generate a compensated signal;
   sampling the compensated signal to generate a sampled compensated signal;
   computing a second distribution of the sampled compensated signal;
   determining that the second distribution does not represent a correct ratio of binary values according to the frequency compensation calibration pattern, wherein the compensated signal is overequalized when the second distribution represents a ratio of ones to zeros that is greater than the correct ratio of binary values; and
   setting the frequency compensation parameter based on the second distribution and the correct ratio.

2. The method of claim 1, further comprising determining that the distribution represents a second correct ratio of binary values according to the offset correction pattern that was transmitted over the serial link by a transmitter circuit.

3. The method of claim 1, further comprising:
   determining that the distribution does not represent a second correct ratio of binary values according to the offset correction pattern that was transmitted over the serial link by a transmitter circuit;
   adjusting the offset correction parameter; and
   repeating the operations of receiving and sampling.

4. The method of claim 3, wherein the second correct ratio of binary values is 50% and the adjusting of the offset correction parameter increases a reference voltage level when the distribution represents a ratio of more ones than zeros.

5. The method of claim 3, wherein the second correct ratio of binary values is 50% and the adjusting of the offset correction parameter decreases a reference voltage level when the distribution represents a ratio of less ones that zeros.

6. The method of claim 1, further comprising transmitting, by the receiver circuit, the distribution to a transmitter circuit that transmitted the offset correction pattern.

7. The method of claim 1, wherein the serial link is configured to transmit a data signal.

8. The method of claim 1, wherein the serial link is configured to transmit a clock signal.

9. The method of claim 1, further comprising determining that the second distribution represents the correct ratio of binary values according to the frequency compensation calibration pattern that was transmitted over the serial link by a transmitter circuit.

10. The method of claim 1, wherein the correct ratio of binary values is 25% ones to zeros and corresponds to a channel symbol rate.

11. The method of claim 1, wherein the compensated signal is underequalized when the second distribution represents a ratio of ones to zeros that is less than the correct ratio of binary values.

12. The method of claim 1, wherein the sampling of the compensated signal uses an asynchronous clock signal.

13. A method, comprising:
receiving, by a receiver circuit, a frequency compensation calibration pattern transmitted over a serial link;
processing the received frequency compensation calibration pattern based on a frequency compensation parameter to generate a compensated signal;
sampling the compensated signal to generate a sampled compensated signal;
computing a distribution of the sampled compensated signal;
determining that the distribution does not represent a correct ratio of binary values according to the frequency compensation calibration pattern, wherein the compensated signal is overequalized when the distribution represents a ratio of ones to zeros that is greater than the correct ratio of binary values; and
setting the frequency compensation parameter based on the distribution and the correct ratio.

14. The method of claim 13, further comprising transmitting, by the receiver circuit, the distribution to a transmitter circuit that transmitted the frequency compensation calibration pattern.

15. A system, comprising:
a receiver circuit that is coupled to a serial link and is configured to:
receive an offset correction pattern transmitted over the serial link;
sample the received offset correction pattern based on an offset correction parameter to generate a sampled signal;
receive a frequency compensation calibration pattern transmitted over the serial link;
process the received frequency compensation calibration pattern based on a frequency compensation parameter to generate a compensated signal; and
sample the compensated signal to generate a sampled compensated signal; and
an offset correction unit that is coupled to the receiver circuit and configured to:
compute a distribution of the signal;
set the offset correction parameter based on the distribution;
compute a second distribution of the sampled compensated signal;
determine that the second distribution does not represent a correct ratio of binary values according to the frequency compensation calibration pattern, wherein the compensated signal is overequalized when the second distribution represents a ratio of ones to zeros that is greater than the correct ratio of binary values; and
set the frequency compensation parameter based on the second distribution and the correct ratio.

16. The system of claim 15, wherein the receiver circuit is further configured to use an asynchronous clock signal to sample the received offset correction pattern.

17. The system of claim 15, wherein the offset correction unit is further configured to determine whether the distribution represents a second correct ratio of binary values according to the offset correction pattern that was transmitted over the serial link by a transmitter circuit.

* * * * *